(12) United States Patent
Nagata

(10) Patent No.: US 10,914,276 B2
(45) Date of Patent: Feb. 9, 2021

(54) INTERNAL COMBUSTION ENGINE PIPE AND INTERNAL COMBUSTION ENGINE

(71) Applicant: TOYOTA JIDOSHA KABUSHIKI KAISHA, Toyota (JP)

(72) Inventor: Ryosuke Nagata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 82 days.

(21) Appl. No.: 16/048,832

(22) Filed: Jul. 30, 2018

(65) Prior Publication Data
US 2019/0107087 A1     Apr. 11, 2019

(30) Foreign Application Priority Data

Oct. 6, 2017     (JP) .................................. 2017-196208

(51) Int. Cl.
| | |
|---|---|
| *F02M 35/10* | (2006.01) |
| *F02B 37/18* | (2006.01) |
| *F02M 35/04* | (2006.01) |
| *F16L 9/22* | (2006.01) |
| *F02M 35/12* | (2006.01) |
| *F02M 35/024* | (2006.01) |
| *F16L 23/036* | (2006.01) |
| *F16L 43/00* | (2006.01) |
| *F16L 55/033* | (2006.01) |

(52) U.S. Cl.
CPC ..... *F02M 35/10144* (2013.01); *F02B 37/186* (2013.01); *F02M 35/024* (2013.01); *F02M 35/044* (2013.01); *F02M 35/1038* (2013.01); *F02M 35/10157* (2013.01); *F02M 35/1255* (2013.01); *F16L 9/22* (2013.01); *F16L 23/036* (2013.01); *F16L 43/008* (2013.01); *F16L 55/033* (2013.01)

(58) Field of Classification Search
CPC ........ F02B 37/18; F02B 37/16; F02B 37/183; F02B 37/186; F02M 35/10144; F02M 35/1038; F02M 35/044; F02M 35/10157; F02M 35/1255; F02M 35/024; F16L 9/22
USPC .................................................. 60/602, 611
See application file for complete search history.

(56) References Cited

U.S. PATENT DOCUMENTS

| | | | | |
|---|---|---|---|---|
| 2,038,085 A | * | 4/1936 | Roos ....................... | F02B 75/20 123/58.1 |
| 4,372,119 A | * | 2/1983 | Gillbrand ................ | F02B 37/18 60/600 |

(Continued)

FOREIGN PATENT DOCUMENTS

| | | |
|---|---|---|
| JP | H10-274117 A | 10/1998 |
| JP | 2005-083266 A | 3/2005 |

(Continued)

*Primary Examiner* — Audrey K Bradley
*Assistant Examiner* — Dapinder Singh
(74) *Attorney, Agent, or Firm* — Oliff PLC

(57) ABSTRACT

An intake pipe includes a cylindrical pipe main body, a flange, which is provided on an end of the pipe main body in an axial direction and protrudes radially outward about an axis of the pipe main body from an outer surface of the pipe main body, and a chamber forming portion, which is located outside of the pipe main body and defines a chamber. The chamber forming portion is provided to connect the outer surface of the pipe main body and the flange to each other and is integrated with the pipe main body and the flange.

2 Claims, 4 Drawing Sheets

(56) References Cited

U.S. PATENT DOCUMENTS

| | | | | |
|---|---|---|---|---|
| 6,173,701 B1* | 1/2001 | Azuma | ............ | F02M 35/10222 |
| | | | | 123/568.17 |
| 6,251,151 B1* | 6/2001 | Kobayashi | .............. | F02B 61/02 |
| | | | | 123/198 E |
| 8,833,326 B2* | 9/2014 | Koyama | .............. | F02M 35/162 |
| | | | | 123/184.57 |
| 8,991,352 B2* | 3/2015 | Kaiser | ........................ | G01F 5/00 |
| | | | | 123/184.21 |
| 9,120,524 B2* | 9/2015 | Ozaki | .................... | B62K 11/04 |
| 9,157,556 B2* | 10/2015 | Quinlan | ................ | F01N 13/082 |
| 9,382,883 B2* | 7/2016 | Nishizawa | ......... | F02M 35/1255 |
| 10,001,092 B2* | 6/2018 | Soeda | ................. | F02M 35/162 |
| 2015/0345440 A1* | 12/2015 | Nishizawa | ......... | F02M 35/1255 |
| | | | | 180/219 |
| 2017/0002752 A1* | 1/2017 | Chi | ........................ | F02D 28/00 |
| 2017/0002759 A1* | 1/2017 | Surnilla | .................. | F02D 21/08 |
| 2017/0002772 A1* | 1/2017 | Perfetto | ................. | F02M 26/09 |
| 2018/0030876 A1* | 2/2018 | Miyoshi | .................... | F01N 3/08 |

FOREIGN PATENT DOCUMENTS

| | | |
|---|---|---|
| JP | 2007-107481 A | 4/2007 |
| JP | 2015-121152 A | 7/2015 |
| JP | 2015-229921 A | 12/2015 |
| JP | 2016-023574 A | 2/2016 |

* cited by examiner

INTERNAL COMBUSTION ENGINE PIPE AND INTERNAL COMBUSTION ENGINE

BACKGROUND

The present disclosure relates to an internal combustion engine pipe and an internal combustion engine.

An exhaust pipe disclosed in Japanese Laid-Open Patent Publication No. 2016-23574 includes an inner cylinder. The inner circumferential surface of the inner cylinder defines an exhaust passage. The inner cylinder is coupled to an outer cylinder. The outer cylinder surrounds the inner cylinder. The inner cylinder and the outer cylinder are coupled to each other at the opposite ends in the longitudinal direction. The outer circumferential surface of the inner cylinder and the inner circumferential surface of the outer cylinder define a chamber. The circumferential wall of the inner cylinder has a through-hole extending through the circumferential wall in the thickness direction.

Inside the exhaust pipe of the publication, some of exhaust gas sometimes flows upstream in the flowing direction of the exhaust gas due to, for example, the reflected wave of the exhaust pressure. In this case, some of the exhaust gas flows into the chamber through the through-hole. This reduces the reflected wave of the exhaust pressure and absorbs the increase and decrease in the exhaust pressure. Thus, the noise caused by the increase and decrease in the exhaust pressure is reduced.

In the exhaust pipe disclosed in the publication, the inner cylinder and the outer cylinder are coupled to each other at the opposite ends. With this configuration, the inner cylinder is separate from the outer cylinder at positions other than the sections where the inner cylinder and the outer cylinder are coupled to each other. Thus, when an external force is applied to the exhaust pipe, the external force is likely to concentrate on the sections where the inner cylinder and the outer cylinder are coupled to each other. Also, if an excessively great external force is applied to the coupling sections, or if an external force is repeatedly applied to the coupling sections, the coupling sections between the inner cylinder and the outer cylinder may possibly be deformed or damaged.

SUMMARY

To achieve the foregoing objective and in accordance with a first aspect of the present disclosure, an internal combustion engine pipe, which is mounted on an internal combustion engine and through which gas flows, is provided. The internal combustion engine pipe includes a cylindrical pipe main body, a flange, which is provided on an end of the pipe main body in an axial direction and protrudes radially outward about an axis of the pipe main body from an outer surface of the pipe main body, and a chamber forming portion, which is located outside of the pipe main body and defines a chamber. The chamber forming portion is provided to connect the outer surface of the pipe main body and the flange to each other and is integrated with the pipe main body and the flange.

To achieve the foregoing objective and in accordance with a second aspect of the present disclosure, an internal combustion engine is provided that includes a forced induction device, which is provided in an intake passage and an exhaust passage and compresses intake air using a flow of exhaust gas, a bypass passage provided in the exhaust passage to bypass the forced induction device, a wastegate, which selectively opens and closes a flow passage of the bypass passage, an actuator, which operates the wastegate in accordance with pressure of gas introduced into the actuator, a connection passage, which connects the inside of the actuator and a section in the intake passage upstream of the forced induction device to each other, a solenoid valve, which is provided in the connection passage and adjusts the pressure of gas introduced into the actuator by selectively opening and closing a flow passage of the connection passage, and an internal combustion engine pipe, which constitutes at least part of a section in the intake passage upstream of the forced induction device. The internal combustion engine pipe includes a cylindrical pipe main body, a flange, which is provided on an end of the pipe main body in an axial direction and protrudes radially outward about an axis of the pipe main body from an outer surface of the pipe main body, and a chamber forming portion, which is located outside of the pipe main body and defines a chamber. The chamber forming portion is provided to connect the outer surface of the pipe main body and the flange to each other and is integrated with the pipe main body and the flange. Between the solenoid valve and the actuator, the connection passage is connected to the chamber of the chamber forming portion and the actuator.

To achieve the foregoing objective and in accordance with a third aspect of the present disclosure, an internal combustion engine is provided that includes a forced induction device, which is provided in an intake passage and an exhaust passage and compresses intake air using a flow of exhaust gas, an air cleaner, which is provided in the intake passage upstream of the forced induction device and filters intake air, and an internal combustion engine pipe, which constitutes at least part of the intake passage between the air cleaner and the forced induction device. The internal combustion engine pipe includes a cylindrical pipe main body, a flange, which is provided on an end of the pipe main body in an axial direction and protrudes radially outward about an axis of the pipe main body from an outer surface of the pipe main body, and a chamber forming portion, which is located outside of the pipe main body and defines a chamber. The chamber forming portion is provided to connect the outer surface of the pipe main body and the flange to each other and is integrated with the pipe main body and the flange. The inside of the pipe main body communicates with the chamber of the chamber forming portion.

Other aspects and advantages of the present disclosure will become apparent from the following description, taken in conjunction with the accompanying drawings, illustrating exemplary embodiments.

BRIEF DESCRIPTION OF THE DRAWINGS

The disclosure may be understood by reference to the following description together with the accompanying drawings.

DETAILED DESCRIPTION

Hereinafter, an internal combustion engine according to one embodiment will be described with reference to the drawings. The internal combustion engine is equipped with an internal combustion engine pipe. First, the general structure of the internal combustion engine will be described.

Figure 1:
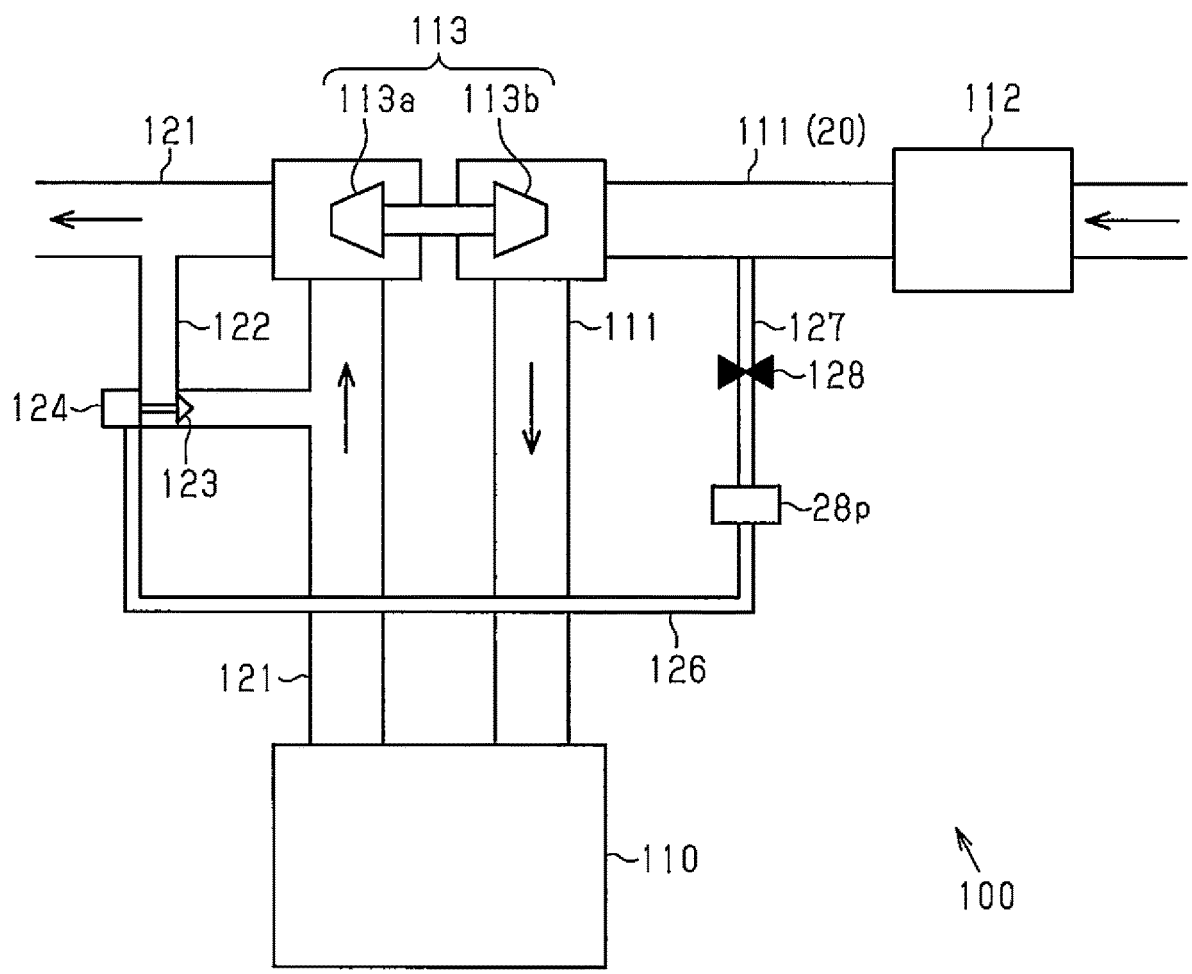
FIG. 1 is a schematic diagram of an internal combustion engine equipped with an intake pipe.

As shown in FIG. 1, an internal combustion engine 100 includes an intake passage 111 for introducing intake air from the outside. Cylinders 110 are connected to the intake passage 111. Air-fuel mixture of fuel and intake air is burned in the cylinders 110. An exhaust passage 121 is connected to the cylinders 110. The exhaust passage 121 discharges exhaust gas to the outside.

An air cleaner 112 is provided in the intake passage 111. The air cleaner 112 filters air introduced into the intake passage 111. A forced induction device 113 is provided downstream of the air cleaner 112 in the intake passage 111. The forced induction device 113 is provided in the intake passage 111 and the exhaust passage 121. A turbine 113a is located in the section of the forced induction device 113 constituting the exhaust passage 121. The turbine 113a is rotated using the flow of the exhaust gas. A compressor 113b is located in the section of the forced induction device 113 constituting the intake passage 111. The compressor 113b feeds the intake air to the cylinders 110 by being rotated together with the turbine 113a. That is, the forced induction device 113 compresses the intake air using the flow of the exhaust gas and then feeds the compressed intake air downstream.

The exhaust passage 121 is provided with a bypass passage 122, which bypasses the forced induction device 113. The bypass passage 122 connects the section of the exhaust passage 121 upstream of the forced induction device 113 and the section of the exhaust passage 121 downstream of the forced induction device 113 to each other. The bypass passage 122 is provided with a wastegate 123. The wastegate 123 selectively opens and closes the flow passage of the bypass passage 122. The amount of the exhaust gas that bypasses the forced induction device 113 using the bypass passage 122 is increased or decreased in accordance with the opening or closing of the bypass passage 122. The compression amount of the intake air is increased or decreased accordingly.

The wastegate 123 is driven by an actuator 124. The actuator 124 selectively opens and closes the wastegate 123 in accordance with the pressure of gas introduced into the actuator 124.

The actuator 124 is connected to a first connection passage 126. The first connection passage 126 is connected to a chamber 28p having a certain volume. The chamber 28p is connected to the section of the intake passage 111 between the air cleaner 112 and the forced induction device 113 via a second connection passage 127. Thus, the actuator 124 is connected to the section of the intake passage 111 between the air cleaner 112 and the forced induction device 113 through the first connection passage 126 and the second connection passage 127.

The second connection passage 127 is provided with a solenoid valve 128, which selectively opens and closes the flow passage of the second connection passage 127. The solenoid valve 128 selectively opens and closes the flow passage of the second connection passage 127 to adjust the pressure of gas introduced into the actuator 124.

Part of the intake passage 111 between the air cleaner 112 and the forced induction device 113 is constituted by an internal combustion engine pipe, which is an intake pipe 20 in this embodiment. The chamber 28p is a space defined inside a chamber forming portion 28 of the intake pipe 20. Hereinafter, the intake pipe 20 will be described in detail.

Figure 2:
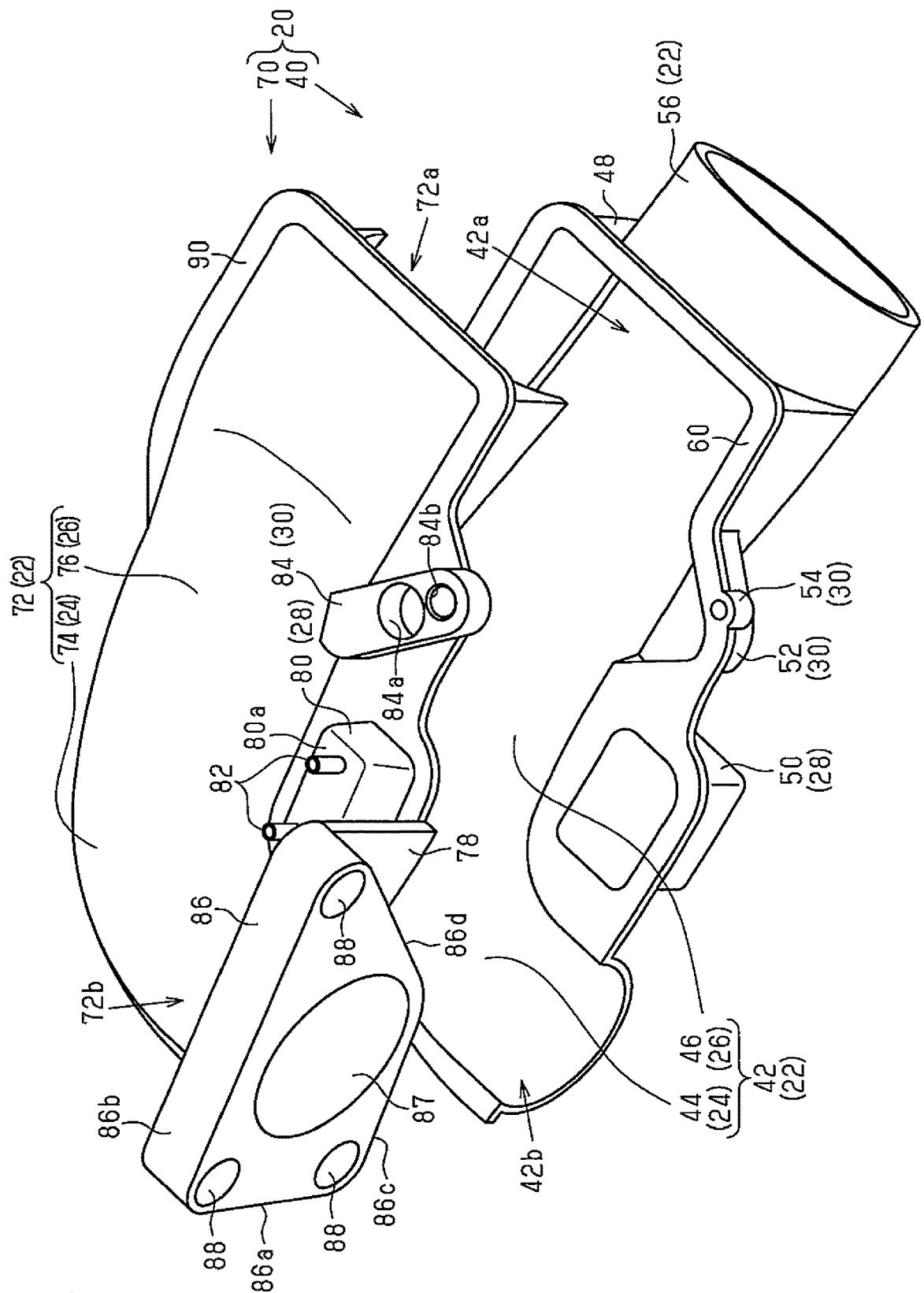
FIG. 2 is an exploded perspective view of the intake pipe.

As shown in FIG. 2, the intake pipe 20 is constituted by a first half pipe 40 and a second half pipe 70, which is mounted to face the first half pipe 40. In the following description, the first half pipe 40 is referred to as a lower portion of the intake pipe 20, and the second half pipe 70 is referred to as an upper portion of the intake pipe 20.

The first half pipe 40 includes a main body forming portion 42, which is shaped like a cylinder cut into half along the axis. The upper side of the main body forming portion 42 is open. One of the ends of the main body forming portion 42 is referred to as a downstream end 42b, and the other end is referred to as an upstream end 42a. The main body forming portion 42 has a curved portion 44 in the vicinity of the downstream end 42b. The curved portion 44 curves from the downstream end 42b toward the upstream end 42a in an arcuate form. The curved portion 44 curves along an arc having a central angle of approximately 90 degrees. The main body forming portion 42 also includes a straight portion 46, which extends straight from the curved portion 44 toward the upstream end 42a. Thus, the main body forming portion 42 has an L shape as a whole.

As shown in FIG. 2, the cross section of the curved portion 44 orthogonal to the axis of the main body forming portion 42, that is, the orthogonal cross section of the curved portion 44 is semicircular. The arc diameter of the curved portion 44 gradually increases toward the upstream end 42a along the axis of the main body forming portion 42.

The orthogonal cross section of the straight portion 46 is U-shaped. The dimension of the U shape of the straight portion 46 gradually increases toward the upstream end 42a along the axis of the main body forming portion 42. More specifically, the diameter of the arc section of the U shape gradually increases toward the upstream end 42a. The dimension of the straight section of the U shape gradually increases toward the upstream end 42a.

The downstream end 42b of the main body forming portion 42 is open. The upstream end 42a of the main body forming portion 42 has a wall portion 48. The wall portion 48 protrudes inward of the main body forming portion 42. The wall portion 48 has a through-hole. The through-hole has a circular shape the diameter of which is equal to the arc diameter of the U shape of the straight portion 46. A cylindrical connecting portion 56 is connected to the wall portion 48 from the outside. The inner diameter of the connecting portion 56 is equal to the diameter of the through-hole of the wall portion 48. The connecting portion 56 is coaxial with the through-hole of the wall portion 48. The inner space of the main body forming portion 42 is open to the outside of the first half pipe 40 through the connecting portion 56.

A flange-like joint portion 60 is provided on the upper edge of the main body forming portion 42. The joint portion 60 protrudes outward of the main body forming portion 42. The joint portion 60 is provided along the entire outer edge of the L shape of the main body forming portion 42. The joint portion 60 is also provided along the entire outer and inner edges of the L shape on the upstream end 42a of the main body forming portion 42. The joint portion 60 is also provided along the entire inner edge of the L shape of the main body forming portion 42.

The protruding width of the joint portion 60 is constant along the entire outer edge of the L shape of the main body forming portion 42. The protruding width of the joint portion 60 is also constant along the entire outer and inner edges of the L shape on the upstream end 42a of the main body forming portion 42. The protruding width of the joint portion 60 on the upstream end 42a is equal to the protruding width of the joint portion 60 on the outer edge of the L shape of the main body forming portion 42. The protruding width of the joint portion 60 on the inner edge of the L shape of the main body forming portion 42 in the vicinity of the upstream end 42a is equal to the protruding width of the joint portion 60 on the outer edge of the L shape of the main body forming portion 42. The protruding width of the joint portion 60 on the inner edge of the L shape of the main body forming portion 42 in a section other than the section in the vicinity of the upstream end 42a is greater than the protruding width of the joint portion 60 on the outer edge of the L shape of the main body forming portion 42.

The section of the joint portion 60 that is recessed downward on the inner edge of the L shape of the main body forming portion 42 forms a mount forming portion 52. The planar shape of the mount forming portion 52 as viewed from the upper side of the first half pipe 40 is a triangle. One of the vertexes of the mount forming portion 52 is oriented outward of the main body forming portion 42. The mount forming portion 52 is formed in the vicinity of the center of the straight portion 46 in the axial direction. The mount forming portion 52 is formed on the upper section of the straight portion 46, that is, on the straight section of the U shape. The outer surface of the mount forming portion 52 is connected to the outer surface of the straight portion 46. The mount forming portion 52 is open to the inside of the main body forming portion 42.

A cylindrical boss 54 bulges downward from the joint portion 60. The boss 54 is formed near the mount forming portion 52. The outer surface of the boss 54 is connected to the outer surface of the mount forming portion 52. When the first half pipe 40 is viewed from the upper side, part of the boss 54 protrudes outward from the outer edge of the joint portion 60. The inner surface of the boss 54 is threaded.

Part of the joint portion 60 on the inner side of the curved portion 44 of the main body forming portion 42 is recessed downward. The recessed part forms a chamber defining bulge 50. The chamber defining bulge 50 is located substantially at the center of the joint portion 60 on the inner side of the curved portion 44. The chamber defining bulge 50 is shaped like a rectangular box. The upper side of the chamber defining bulge 50 is open.

The main body forming portion 42, the connecting portion 56, the joint portion 60, the mount forming portion 52, the boss 54, and the chamber defining bulge 50 are an integrally molded plastic member.

The second half pipe 70 will now be described.

The second half pipe 70 includes a main body forming portion 72, which is shaped like a cylinder cut into half along the axis. The lower side of the main body forming portion 72 is open. The planar shape of the main body forming portion 72 when the second half pipe 70 is viewed from the upper side generally conforms to the planar shape of the main body forming portion 42 of the first half pipe 40. Thus, when one of the ends of the main body forming portion 72 is referred to as a downstream end 72b, and the other end is referred to as an upstream end 72a, the main body forming portion 72 has a curved portion 74 in the vicinity of the downstream end 72b. The curved portion 74 curves from the downstream end 72b toward the upstream end 72a in an arcuate form. The curved portion 74 curves along an arc having a central angle of approximately 90 degrees. The main body forming portion 72 also includes a straight portion 76, which extends straight from the curved portion 74 toward the upstream end 72a. Thus, the main body forming portion 72 has an L shape as a whole. When the second half pipe 70 is viewed from the upper side, the curved portion 74 is located to cover the curved portion 44 of the first half pipe 40. When the second half pipe 70 is viewed from the upper side, the straight portion 76 is located to cover the straight portion 46 of the first half pipe 40.

The cross section of the curved portion 74 orthogonal to the axis of the main body forming portion 72, that is, the orthogonal cross section of the curved portion 74 is semicircular. The arc diameter of the curved portion 74 gradually increases toward the upstream end 72a along the axis of the main body forming portion 72. The arc diameter of the curved portion 74 is equal to the arc diameter of the curved portion 44 of the first half pipe 40.

The orthogonal cross section of the straight portion 76 is U-shaped. The dimension of the U shape of the straight portion 76 gradually increases toward the upstream end 72a along the axis of the main body forming portion 72. More specifically, the diameter of the arc section of the U shape gradually increases toward the upstream end 72a. The dimension of the straight section of the U shape gradually increases toward the upstream end 72a. The diameter of the arc section of the U shape of the straight portion 76 is equal to the diameter of the arc section of the U shape of the straight portion 46 of the first half pipe 40. The distance between the straight sections of the U shape on the outer surface of the straight portion 76 is equal to the distance between the straight sections of the U shape on the inner surface of the straight portion 46 of the first half pipe 40.

The upstream end 72a of the main body forming portion 72 is open. A flange 86 is provided on the downstream end 72b of the main body forming portion 72. The flange 86 protrudes outward in a direction orthogonal to the axis of the main body forming portion 72. The flange 86 protrudes outward of an outer circumferential imaginary circle including the outer surface of the curved portion 74 on the downstream end 72b of the main body forming portion 72. The planar shape of the flange 86 is a trapezoid when the main body forming portion 72 is viewed from the axial direction. The flange 86 has a predetermined thickness along the axis of the main body forming portion 72.

Figure 4:
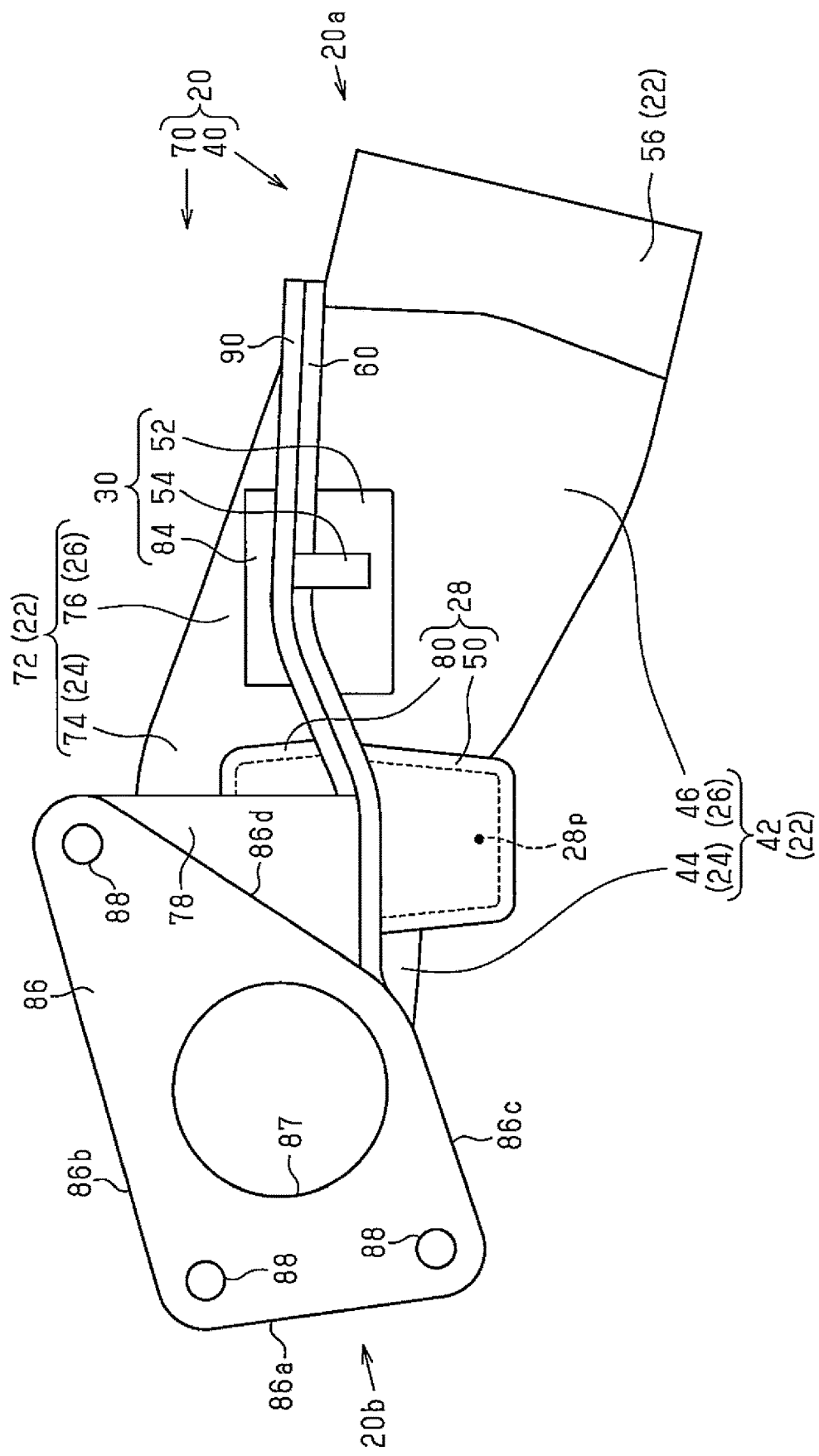
FIG. 4 is a side view of the intake pipe.

As shown in FIG. 4, when viewed from the axial direction of the main body forming portion 72, a first side 86a of the flange 86 is located outward of the curved portion 74. The first side 86a extends substantially in a vertical direction. A second side 86b of the flange 86 is located close to the uppermost section of the outer surface of the curved portion 74. The second side 86b extends from the outer side of the curved portion 74 to the inner side of the curved portion 74. A third side 86c of the flange 86 is located lower than the curved portion 74. The third side 86c is substantially parallel to the second side 86b. The third side 86c is shorter than the second side 86b. A fourth side 86d of the flange 86 is located on the inner side of the curved portion 74. The fourth side 86d is located between the end of the third side 86c and the end of the second side 86b. The fourth side 86d is inclined between the position slightly lower than the curved portion 74 and the position close to the uppermost section of the outer surface of the curved portion 74.

As shown in FIGS. 2 and 4, the flange 86 has a passage through-hole 87. The passage through-hole 87 extends through the flange 86 in the axial direction of the main body forming portion 72. The diameter of the passage through-hole 87 is equal to the diameter of the inner circumferential imaginary circle including the inner surface of the curved portion 74 on the downstream end 72b of the main body forming portion 72. The central axis of the passage through-hole 87 passes through the center of the inner circumferential imaginary circle. The upper section of the inner surface of the passage through-hole 87 is smoothly connected to the inner surface of the curved portion 74.

The flange 86 has three bolt through-holes 88. The bolt through-holes 88 extend through the flange 86 in the axial direction of the main body forming portion 72. The bolt through-holes 88 are located in the vicinity of three corners except the corner formed by the third side 86c and the fourth side 86d of the flange 86.

Figure 3:
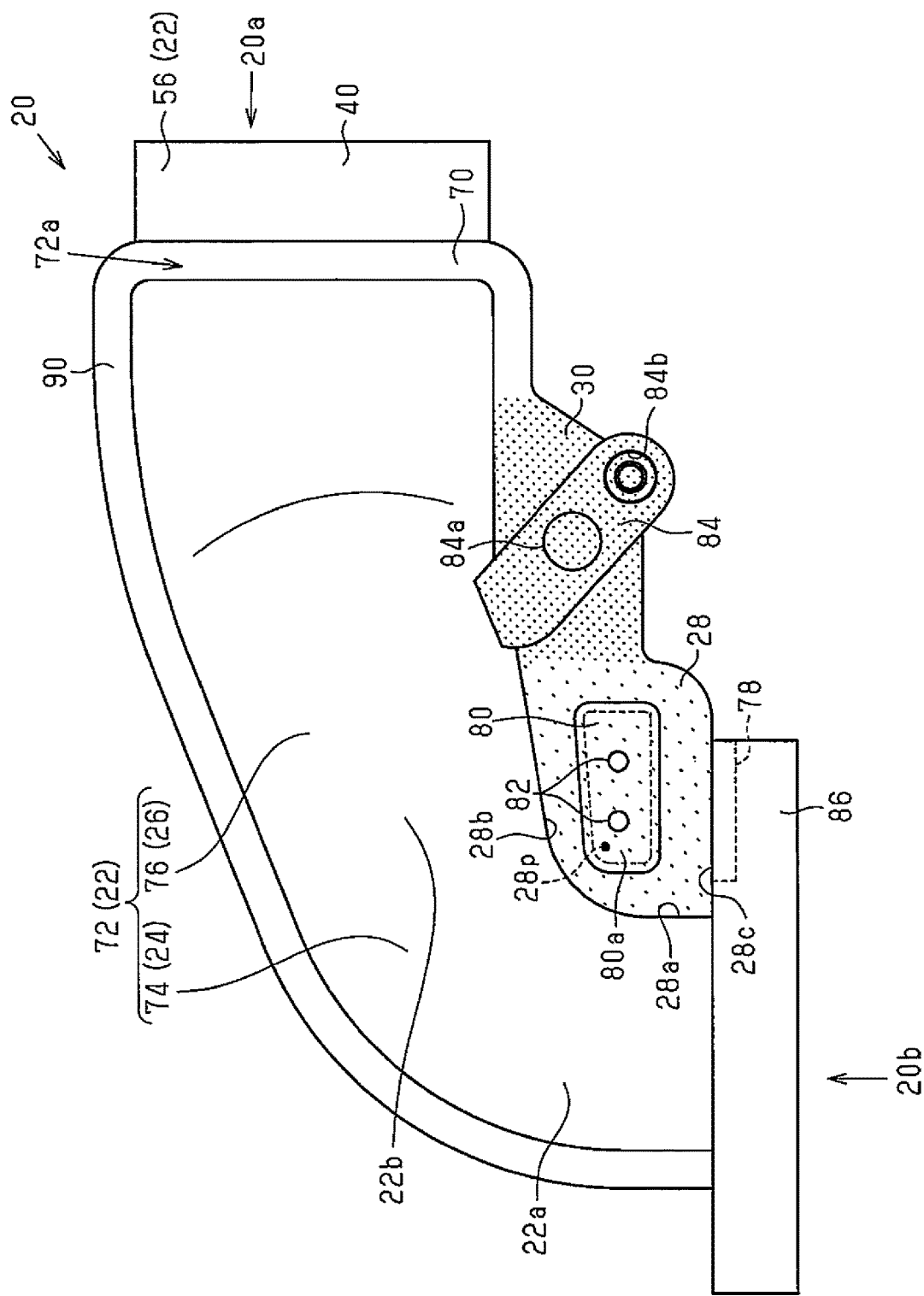
FIG. 3 is a top view of the intake pipe.

As shown in FIGS. 2 and 3, the main body forming portion 72 is provided with a flange-like joint portion 90. The joint portion 90 protrudes outward of the main body forming portion 72. The joint portion 90 is provided along the entire outer edge of the L shape of the main body forming portion 72. The joint portion 90 is also provided along the entire outer and inner edges of the L shape on the upstream end 72a of the main body forming portion 72. The joint portion 90 is also provided along the entire inner edge of the L shape of the main body forming portion 72. The joint portion 90 extends along the lower edge of the main body forming portion 72 on the curved portion 74. The joint portion 90 extends along the boundary between the straight section and the arcuate section of the U shape on the straight portion 76 and the upstream end 72a.

The protruding width of the joint portion 90 is constant along the entire outer edge of the L shape of the main body forming portion 72. The protruding width of the joint portion 90 is also constant along the entire region between the outer edge and the inner edge of the L shape on the upstream end 72a of the main body forming portion 72. The protruding width of the joint portion 90 on the upstream end 72a is equal to the protruding width of the joint portion 90 on the outer edge of the L shape of the main body forming portion 72. The protruding width of the joint portion 90 on the inner edge of the L shape of the main body forming portion 72 in the vicinity of the upstream end 72a of the main body forming portion 72 is equal to the protruding width of the joint portion 90 on the outer edge of the L shape. The protruding width of the joint portion 90 on the inner edge of the L shape of the main body forming portion 72 in a section other than the section in the vicinity of the upstream end 72a is greater than the protruding width of the joint portion 90 on the outer edge of the L shape of the main body forming portion 72. The protruding width of the joint portion 90 is equal to the protruding width of the joint portion 60 of the first half pipe 40. When the second half pipe 70 is viewed from the upper side, the joint portion 90 is located to cover the joint portion 60 of the first half pipe 40.

The joint portion 90 on the inner edge of the L shape of the main body forming portion 72 is connected to the surface of the flange 86 in the vicinity of the main body forming portion 72. More specifically, the joint portion 90 is connected to the section of the flange 86 in the vicinity of the corner formed by the third side 86c and the fourth side 86d.

A mounting projection 84 projects upward from the joint portion 90 on the inner edge of the L shape of the main body forming portion 72. The mounting projection 84 is shaped like an elongated cuboid and extends outward from the outer surface of the main body forming portion 72. The mounting projection 84 is formed in the vicinity of the center of the straight portion 76 in the axial direction.

The mounting projection 84 has a sensor mounting hole 84a. The sensor mounting hole 84a extends through the mounting projection 84 in the vertical direction. When the second half pipe 70 is viewed from the upper side, the sensor mounting hole 84a is located inside of the mount forming portion 52 of the first half pipe 40. The mounting projection 84 has a bolt mounting hole 84b. The bolt mounting hole 84b extends through the mounting projection 84 in the vertical direction. The bolt mounting hole 84b is provided in such a manner that the sensor mounting hole 84a is located between the bolt mounting hole 84b and the main body forming portion 72. The axis of the bolt mounting hole 84b is aligned with the axis of the hole of the boss 54 in the first half pipe 40.

Part of the joint portion 90 on the inner side of the curved portion 74 of the main body forming portion 72 is recessed upward. The recessed part forms a chamber defining bulge 80. The chamber defining bulge 80 is located substantially at the center of the joint portion 90 on the inner side of the curved portion 74. The chamber defining bulge 80 is shaped like a rectangular box. The lower side of the chamber defining bulge 80 is open. The dimension of the opening of the chamber defining bulge 80 is equal to the dimension of the opening of the chamber defining bulge 50 of the first half pipe 40. When the second half pipe 70 is viewed from the upper side, the chamber defining bulge 80 is located to cover the chamber defining bulge 50 of the first half pipe 40.

Two communication portions 82 project upward from the outer surface of a bottom wall 80a (upper wall) of the chamber defining bulge 80. The communication portions 82 are tubular. The communication portions 82 connect the inside and the outside of the chamber defining bulge 80.

A plate-like bridge 78 projects upward from the outer edge of the joint portion 90 on the inner side of the curved portion 74 of the main body forming portion 72. The bridge 78 is connected to the surface constituting the fourth side 86d of the flange 86. As shown in FIG. 4, the bridge 78 is connected to substantially the entire region between the end of the fourth side 86d of the flange 86 in the vicinity of the third side 86c and the end of the fourth side 86d of the flange 86 in the vicinity of the second side 86b. Since the fourth side 86d of the flange 86 is inclined, the bridge 78 is triangular when viewed from the axial direction of the main body forming portion 72.

The main body forming portion 72, the flange 86, the joint portion 90, the mounting projection 84, and the chamber defining bulge 80 are an integrally molded plastic member.

The structure of the intake pipe 20 constituted by the first half pipe 40 and the second half pipe 70 will now be described. The first half pipe 40 and the second half pipe 70 are integrated by joining the joint portions 60, 90. The joint portion 60 and the joint portion 90 are welded to each other by, for example, vibration welding.

As shown in FIGS. 2 and 4, the main body forming portion 42 and the connecting portion 56 of the first half pipe 40, and the main body forming portion 72 of the second half pipe 70 form a substantially cylindrical pipe main body 22. As shown in FIGS. 3 and 4, the end of the pipe main body 22 in the vicinity of the connecting portion 56 is an upstream end 20a (second end), into which the intake air flows. The end of the pipe main body 22 opposite to the connecting portion 56 is a downstream end 20b (first end), from which the intake air flows out. The downstream section of the pipe main body 22 corresponds to the shape of the main body forming portion 42 of the first half pipe 40 and the main body forming portion 72 of the second half pipe 70. That is, the downstream section of the pipe main body 22 is a curved portion 24, which curves in an arcuate form from the downstream end 20b (first end) toward the upstream end 20a (second end). The upstream section of the pipe main body 22 is a straight portion 26, which extends straight from the curved portion 24 toward the upstream end 20a.

As shown in FIG. 2, the inner surface of the curved portion 44 of the first half pipe 40 is opposed to the inner surface of the curved portion 74 of the second half pipe 70 inside the pipe main body 22. The straight section of the U shape of the straight portion 76 of the second half pipe 70 is located inward of the straight section of the U shape of the straight portion 46 of the first half pipe 40. The arcuate section of the U shape of the straight portion 76 of the second half pipe 70 is opposed to the arcuate section of the U shape of the straight portion 46 of the first half pipe 40. Thus, an intake passage is defined inside the pipe main body 22 along the entire region of the pipe main body 22 in the axial direction. The intake passage is a flow passage through which the intake air flows. The cross section of the intake passage as viewed from the axial direction is circular.

As shown in FIGS. 3 and 4, the flange 86 is provided on the downstream end 20*b* of the pipe main body 22. The flange 86 protrudes from the outer surface of the pipe main body 22 radially outward about the axis of the pipe main body 22. Bolts are inserted in the bolt through-holes 88 of the flange 86. The bolts are secured to the forced induction device 113.

The chamber forming portion 28 is located on the outside of the pipe main body 22. The chamber forming portion 28 is located on the inner side of the curved portion 74. The chamber forming portion 28 includes the chamber defining bulge 50 of the first half pipe 40, the chamber defining bulge 80 of the second half pipe 70, and the joint portions 60, 90 around the chamber defining bulges 50, 80. That is, the chamber forming portion 28 includes the joint portion 60 on the inner side of the curved portion 44 of the first half pipe 40. The chamber forming portion 28 also includes the joint portion 90 on the inner side of the curved portion 74 of the second half pipe 70. FIG. 3 shows the chamber forming portion 28 with a lightly-dotted pattern.

As shown in FIG. 3, the chamber forming portion 28 includes three sides 28*a* to 28*c*, which are connected to the outer surface (outer circumferential surface) of the pipe main body 22 and the flange 86. The first side 28*a* of the chamber forming portion 28 is connected to a main body first portion 22*a* in the curved portion 24 of the pipe main body 22 located in the vicinity of the downstream end 20*b*. The second side 28*b* of the chamber forming portion 28 is connected to a main body second portion 22*b* in the curved portion 24 of the pipe main body 22 located in the vicinity of the upstream end 20*a*. Part of the third side 28*c* of the chamber forming portion 28 is connected to the flange 86. Part of the third side 28*c* is also connected to the flange 86 via the bridge 78. The second side 28*b* and the third side 28*c* are generally orthogonal to the first side 28*a*.

In the chamber forming portion 28, the opening of the chamber defining bulge 50 of the first half pipe 40 is opposed to the opening of the chamber defining bulge 80 of the second half pipe 70. The inner surfaces of the chamber defining bulges 50, 80 define the chamber 28*p*. One of the two communication portions 82 provided on the outer surface of the chamber forming portion 28 is connected to the pipe constituting the first connection passage 126. The other one of the communication portions 82 is connected to the pipe constituting the second connection passage 127.

As shown in FIG. 3, a sensor mount 30 projects from the outer surface of the pipe main body 22. A sensor for measuring the pressure of the intake air is mounted on the sensor mount 30. FIG. 3 shows the sensor mount 30 with a heavily-dotted region.

The sensor mount 30 is provided in such a manner that the chamber forming portion 28 is located between the sensor mount 30 and the flange 86. As shown in FIGS. 2 and 4, the sensor mount 30 includes the mount forming portion 52 and the boss 54 of the first half pipe 40 and the mounting projection 84 of the second half pipe 70. The sensor mount 30 also includes the joint portion 60 around the mount forming portion 52 of the first half pipe 40. That is, the sensor mount 30 includes the section of the joint portion 60 on the inner edge of the L shape of the main body forming portion 42 of the first half pipe 40 corresponding to the straight portion 46. The sensor mount 30 also includes the joint portion 90 around the mounting projection 84 of the second half pipe 70. That is, the sensor mount 30 includes the section of the joint portion 90 on the inner edge of the L shape of the main body forming portion 72 of the second half pipe 70 corresponding to the straight portion 76. The sensor mount 30 is connected to the chamber forming portion 28. That is, the sensor mount 30 is integrated with the chamber forming portion 28, the pipe main body 22, and the flange 86.

The sensor is secured to the mounting projection 84 in a state in which the sensor extends through the sensor mounting hole 84*a*. A measuring chamber is defined below the mounting projection 84 by the inner surface of the mount forming portion 52 and the lower surface of the joint portion 90 of the second half pipe 70. The measuring chamber is partially disconnected from the intake passage. The sensor mounted on the mounting projection 84 measures the pressure of the intake air that flows into the measuring chamber. A bolt extends through the bolt mounting hole 84*b* of the mounting projection 84 and is screwed to the inner surface of the boss 54 of the first half pipe 40.

An operation and advantages of the present embodiment will now be described.

(1) It is now assumed that the chamber forming portion 28 is connected to the outer surface of the pipe main body 22 with only the first side 28*a*. In this case, the boundary between the first side 28*a* of the chamber forming portion 28 and the outer surface of the pipe main body 22 cannot reliably resist an external force applied in the circumferential direction about the axis of the main body first portion 22*a* of the pipe main body 22 and an external force applied in the radial direction about the axis. Thus, if such external forces are applied to the chamber forming portion 28, the boundary between the first side 28*a* of the chamber forming portion 28 and the outer surface of the pipe main body 22 is easily deformed and damaged.

In contrast, in the present embodiment, the chamber forming portion 28 is connected to the outer surface of the pipe main body 22 not only with the first side 28*a* but also with the second side 28*b*. In this case, the boundary between the second side 28*b* of the chamber forming portion 28 and the outer surface of the pipe main body 22 resists the external force applied in the circumferential direction about the axis of the main body first portion 22*a* of the pipe main body 22 and the external force applied in the radial direction about the axis. Thus, if such external forces are applied to the chamber forming portion 28, the boundary between the second side 28*b* of the chamber forming portion 28 and the outer surface of the pipe main body 22 receives the external forces. As a result, the load applied to the boundary between the first side 28*a* of the chamber forming portion 28 and the outer surface of the pipe main body 22 is reduced.

Additionally, the chamber forming portion 28 is connected to both the flange 86 and the bridge 78 with the third side 28*c*. In this case, the boundary of the third side 28*c* with respect to the flange 86 and the bridge 78 also resists the external force applied in the circumferential direction about the axis of the main body first portion 22*a* of the pipe main body 22 and the external force applied in the radial direction about the axis. Thus, if such external forces are applied to the chamber forming portion 28, the boundary of the third side 28*c* of the chamber forming portion 28 with respect to the flange 86 and the bridge 78 also receives the external forces.

As a result, the load applied to the boundary between the first side 28a of the chamber forming portion 28 and the outer surface of the pipe main body 22 is reduced.

As described above, since the boundaries corresponding to the second side 28b and the third side 28c of the chamber forming portion 28 receive the external forces, the load applied to the boundary between the first side 28a of the chamber forming portion 28 and the outer surface of the pipe main body 22 is reduced.

Likewise, since the boundary between the first side 28a of the chamber forming portion 28 and the outer surface of the pipe main body 22 also receives the external force applied in the circumferential direction about the axis of the main body second portion 22b of the pipe main body 22 and the external force applied in the radial direction about the axis, the load applied to the boundaries corresponding to the second side 28b and the third side 28c of the chamber forming portion 28 is reduced.

Thus, the boundaries between the chamber forming portion 28 and the outer surface of the pipe main body 22, the flange 86, and the bridge 78 are unlikely to be deformed or damaged.

(2) The chamber forming portion 28 is located on the inner side of the curved portion 24 of the pipe main body 22. Thus, if an external force that bends the curved portion 24 outward or an external force that bends the curved portion 24 inward is applied to the curved portion 24, the chamber forming portion 28 resists the external force. Consequently, the chamber forming portion 28 increases the rigidity of the pipe main body 22. The rigidity of the pipe main body 22 is therefore improved.

(3) The sensor mount 30 is connected to the chamber forming portion 28. Thus, the chamber forming portion 28 and the sensor mount 30 function as a single reinforcing rib. The chamber forming portion 28 and the sensor mount 30 are integrated to receive the external force applied to the pipe main body 22 and inhibit deformation of the pipe main body 22. For this reason, the resistance to the external force is further increased compared with a case in which the chamber forming portion 28 and the sensor mount 30 are not integrated. The rigidity of the pipe main body 22 is therefore improved.

(4) The chamber forming portion 28 may be formed separately from the pipe main body 22 and coupled to the pipe main body 22 using a mounting member such as a bracket. In this case, the mass is increased due to the mounting member, and a space for placing the mounting member is necessary.

In contrast, in the present embodiment, the chamber defining bulge 50 of the first half pipe 40, which constitutes the chamber forming portion 28, and the joint portion 60 around the chamber defining bulge 50 are formed integrally with the main body forming portion 42 of the first half pipe 40. Additionally, the chamber defining bulge 80 of the second half pipe 70 and the joint portion 90 about the chamber defining bulge 80 are integrally formed with the main body forming portion 72 of the second half pipe 70. The first half pipe 40 and the second half pipe 70 are welded to each other. With this configuration, since the mounting member is unnecessary, the mass is not increased due to the mounting member, and the space for placing the mounting member is unnecessary.

(5) As shown in FIG. 1, gas temporarily flows into the chamber 28p between the solenoid valve 128 and the actuator 124. Thus, the chamber 28p is utilized as a resonator for reducing the noise of the gas in the first connection passage 126 and the second connection passage 127. That is, the vibration of the gas in a specific cycle generated in the first connection passage 126 and the second connection passage 127 in accordance with the operation of the solenoid valve 128 resonate to the vibration of the gas generated in the chamber 28p, so that the vibration is attenuated. Specifically, the gas sometimes vibrates in a specific cycle in accordance with the operation of the solenoid valve 128 in the first connection passage 126 and the second connection passage 127. In this case, the vibration of the gas in a specific cycle generated in accordance with the operation of the solenoid valve 128 is amplified due to the self-induced vibration that occurs in the forming portions of the solenoid valve 128. The vibration of the gas amplified as described above causes noise in the first connection passage 126 and the second connection passage 127. In this respect, according to the present embodiment, the vibration of the gas in a specific cycle is attenuated, so that the self-induced vibration in the forming portions of the solenoid valve 128 is reduced. This inhibits the amplification of the vibration of gas and reduces the noise of the gas.

The above embodiment may be modified as follows.

The intake pipe 20 may be used in the intake passage 111 upstream of the air cleaner 112 as the internal combustion engine pipe. The intake pipe 20 may be used in the intake passage 111 downstream of the forced induction device 113 as the internal combustion engine pipe. An exhaust pipe having the same structure as the intake pipe 20 may be used in part of the exhaust passage 121 as the internal combustion engine pipe. Even if the position of the intake pipe 20 is changed as described above, the chamber 28p is utilized as a resonator as in the above-described embodiment as long as a pipe constituting the first connection passage 126 is connected to one of the two communication portions 82, and a pipe constituting the second connection passage 127 is connected to the other one of the communication portions 82.

As in the above-described embodiment, when the intake pipe 20 constitutes at least part of the intake passage 111 between the air cleaner 112 and the forced induction device 113, the chamber 28p may communicate with the intake passage 111 of the intake pipe 20. In this case, pipes connected to the intake pipe 20 are connected to the two communication portions 82. In this manner, the chamber 28p communicates with the intake passage 111 of the intake pipe 20.

In this case, some of the intake air flowing through the intake passage 111 flows into the chamber 28p. Additionally, the chamber 28p is utilized as a resonator that silences the noise associated with the flow of the intake air. That is, the vibration of gas caused in the intake passage 111 resonates to the vibration of gas caused in the chamber 28p to be attenuated. This reduces the noise caused by the vibration of gas in the intake passage 111.

It is required to use only at least one of the communication portions 82 to connect the chamber 28p to the intake passage 111. The other one of the communication portions 82 may be closed or omitted. Whether to use both the two communication portions 82 or one of the communication portions 82 to connect the chamber 28p to the intake passage 111 may be determined in accordance with the frequency of the vibration of the intake air that is intended to be silenced in the intake passage 111.

The intake pipe 20 does not necessarily have to be made of plastic, but may be made of metal.

The first half pipe 40 and the second half pipe 70 may be welded to each other by a method other than vibration welding such as laser welding or ultrasonic welding. Alternatively, the first half pipe 40 and the second half pipe 70 may be coupled to each other using an adhesive. If the intake pipe 20 is made of metal, the first half pipe 40 and the second half pipe 70 may be coupled to each other by other welding methods.

The first half pipe 40 and the second half pipe 70 may be coupled to each other using mounting members such as bolts and brackets. In this case, the structure in which the pipe main body 22, the chamber forming portion 28, and the sensor mount 30 are integrated is achieved as long as the main body forming portion 42, the chamber defining bulge 50, and the mount forming portion 52 are integrally formed in the first half pipe 40, and the main body forming portion 72, the chamber defining bulge 80, and the mounting projection 84 are integrally formed in the second half pipe 70. To reduce the mass of the intake pipe 20 and the space for providing the brackets, the first half pipe 40 and the second half pipe 70 are preferably coupled to each other by, for example, welding without using the mounting members.

The sensor mount 30 may be separate from the chamber forming portion 28. In this case also, the chamber forming portion 28 improves the rigidity of the pipe main body 22.

Instead of the sensor for measuring the pressure inside the intake pipe 20, a temperature sensor may be mounted on the sensor mount 30.

As long as various sensors can be mounted on the sensor mount 30, the shape of the sensor mount 30 may be changed as required.

The sensor mount 30 may be molded separately from the pipe main body 22 and coupled to the pipe main body 22 in the following process. In this case, the sensor mount 30 may be coupled to the pipe main body 22 by welding or with an adhesive, or may be coupled to the pipe main body 22 using a mounting member such as a bracket. To reduce the mass of the intake pipe 20 and the space for providing the bracket, the sensor mount 30 is preferably coupled to the pipe main body 22 by, for example, welding without using the mounting member.

As long as the chamber forming portion 28 is connected to the outer surface of the pipe main body 22 and the flange 86, the shape of the chamber forming portion 28 may be changed as required. For example, in the first half pipe 40, the joint portion 60 may be omitted from between the main body forming portion 42 and the chamber defining bulge 50, and the main body forming portion 42 may be directly connected to the chamber defining bulge 50. Likewise, in the second half pipe 70, the joint portion 90 may be omitted from between the main body forming portion 72 and the chamber defining bulge 80, and the main body forming portion 72 may be directly connected to the chamber defining bulge 80. The first half pipe 40 and the second half pipe 70 shaped as described above may be coupled to each other. Alternatively, in the first half pipe 40, the joint portion 60 may be omitted from between the flange 86 and the chamber defining bulge 50, and the flange 86 may be directly connected to the chamber defining bulge 50. The same applies to the second half pipe 70.

The dimension of the chamber 28p may be changed in accordance with the frequency of the vibration of the gas that is intended to be resonated inside the chamber 28p.

The chamber forming portion 28 may be molded separately from the pipe main body 22 of the intake pipe 20 and coupled to the pipe main body 22 and the flange 86 in the following process. In this case, the chamber forming portion 28 is preferably connected to the outer surface of the pipe main body 22 and the flange 86 directly by welding or with an adhesive. With this configuration, the chamber forming portion 28 is supported not only by the outer surface of the pipe main body 22 but also by the flange 86. Thus, if an external force is applied to the chamber forming portion 28 and the pipe main body 22, the external force acts not only on the boundary between the chamber forming portion 28 and the outer surface of the pipe main body 22 but also on the boundary between the chamber forming portion 28 and the flange 86. This inhibits deformation and damage on the boundaries of the chamber forming portion 28 with respect to the pipe main body 22 and the flange 86.

The chamber forming portion 28 may be mounted on the pipe main body 22 using a mounting member such as a bracket. However, the chamber forming portion 28 is preferably coupled to the outer surface of the pipe main body 22 and the flange 86 by, for example, welding without using the mounting member in order to inhibit the increase in the mass due to the mounting member and to reduce the space for mounting the mounting member. Additionally, the chamber forming portion 28 is preferably coupled to the outer surface of the pipe main body 22 and the flange 86 by, for example, welding without using the mounting member in order also to more reliably support the chamber forming portion 28 by the outer surface of the pipe main body 22 and the flange 86.

The chamber forming portion 28 may be located on the outer side of the curved portion 24 of the intake pipe 20. The chamber forming portion 28 must be connected to the outer surface of the pipe main body 22 and the flange 86. As long as the chamber forming portion 28 is connected to the outer surface of the pipe main body 22 and the flange 86, the chamber forming portion 28 is supported not only by the outer surface of the pipe main body 22 but also by the flange 86.

As long as gas can flow through the inside of the pipe main body 22 of the intake pipe 20, the shape of the pipe main body 22 may be changed as required.

The curved portion 24 may be omitted from the pipe main body 22 of the intake pipe 20. For example, the pipe main body 22 may be a pipe that extends straight along the entire length, and the flange 86 may be provided on the distal end of the pipe main body 22. In this case also, the chamber forming portion 28 must be connected to the pipe main body 22 and the flange 86.

As long as the flange 86 protrudes radially outward from the outer surface of the pipe main body 22, the shape of the flange 86 may be changed as required. For example, the flange 86 may be rectangular when viewed from the axial direction of the pipe main body 22. Depending on the shape and the dimension of the flange 86, the region of the third side 28c of the chamber forming portion 28 connected to the flange 86 via the bridge 78 may be reduced, and the region directly connected to the flange 86 may be increased. More specifically, as the region of the flange 86 opposed to the third side 28c of the chamber forming portion 28 is increased, the region of the third side 28c of the chamber forming portion 28 that can be directly connected to the flange 86 is increased. In this case, even if the bridge 78 is omitted, the flange 86 and the third side 28c are adequately coupled to each other. For example, as viewed from the axial direction of the pipe main body 22 as shown in FIG. 4, the third side 86c of the flange 86 may have substantially the same length as the second side 86b, and the entire region of the third side 86c may be located below the third side 28c of the chamber forming portion 28. In this case, the bridge 78 may be omitted, and substantially the entire region of the third side 28c of the chamber forming portion 28 may be directly connected to the surface of the flange 86 in the vicinity of the pipe main body 22.

The pipe main body of the internal combustion engine pipe may be formed into a cylinder in advance. The molding of the pipe main body is possible if the pipe main body is a straight cylinder. In this case, the flange and the chamber forming portion molded in a separate process may be coupled to the outer surface of the cylinder. A sensor mount may further be coupled to the outer surface of the cylinder. In this case also, the chamber forming portion must be connected to the flange and the outer surface of the pipe main body.

Therefore, the present examples and embodiments are to be considered as illustrative and not restrictive and the disclosure is not to be limited to the examples and embodiments given herein.

The invention claimed is:

1. An internal combustion engine pipe, which is mounted on an internal combustion engine and through which gas flows, the internal combustion engine pipe comprising:
  a cylindrical pipe main body;
  a sensor mount, which projects from an outer circumferential surface of the pipe main body and receives a sensor for measuring a pressure inside the pipe main body;
  a flange on an end of the pipe main body in an axial direction and that protrudes radially outward about an axis of the pipe main body from an outer surface of the pipe main body; and
  a chamber forming portion outside of the pipe main body between the sensor mount and the flange and that defines a chamber, wherein
  the chamber forming portion connects the outer surface of the pipe main body and the flange to each other and is integral with the pipe main body and the flange, and
  the sensor mount is connected to the chamber forming portion and is integral with the chamber forming portion, the pipe main body, and the flange.

2. The internal combustion engine pipe according to claim 1, wherein
  the pipe main body includes a first end, on which the flange is provided, a second end, which is opposite to the first end, and a curved portion, which curves in an arcuate manner from the first end toward the second end, and
  the chamber forming portion is on the inner side of the curved portion.

\* \* \* \* \*